United States Patent [19]

De Niet

[11] 4,425,562

[45] Jan. 10, 1984

[54] DEVICE FOR CODING SIGNALS WHICH ARE DISTRIBUTED BETWEEN A NUMBER OF CHANNELS

[75] Inventor: Edmond De Niet, Eindhoven, Netherlands

[73] Assignee: U.S. Philips Corporation, New York, N.Y.

[21] Appl. No.: 350,835

[22] Filed: Feb. 22, 1982

Related U.S. Application Data

[63] Continuation of Ser. No. 136,238, Apr. 1, 1980, abandoned, which is a continuation of Ser. No. 913,297, Jun. 27, 1978, abandoned.

[30] Foreign Application Priority Data

Jul. 7, 1977 [NL] Netherlands .......................... 7707540

[51] Int. Cl.³ ............................................ H03K 13/02
[52] U.S. Cl. ................................ 340/347 DD; 370/18
[58] Field of Search .................. 340/347 DD; 360/22, 360/23; 370/18

[56] References Cited

U.S. PATENT DOCUMENTS

| | | | |
|---|---|---|---|
| 3,262,104 | 7/1966 | Clynes | 360/23 |
| 3,358,083 | 12/1967 | Helm | 370/18 |
| 3,573,799 | 4/1971 | Drinnan | 340/347 DD |
| 3,631,471 | 12/1971 | Griffiths | 340/347 DD |
| 3,689,899 | 9/1972 | Franaszek | 340/347 DD |
| 4,139,839 | 2/1979 | Fletcher | 340/347 DD |

Primary Examiner—C. D. Miller
Attorney, Agent, or Firm—James J. Cannon, Jr.

[57] ABSTRACT

A device for introducing digital data into a medium having bivalent or multivalent states and having a coding device and a commutation device. The coding device receives under the control of a first clock pulse series, data signals and forms therefrom a number of code bits which are combined as an input to the commutation device. The coding efficiency is smaller than 1. Under the control of a second clock pulse series, the commutation device switches each input to apply the code bits to a number of channels of the medium, so that for each channel certain code restrictions are satisfied.

4 Claims, 10 Drawing Figures

| $X_1 X_2 X_3 X_4$ | $P_1 P_2 P_3 P_4 P_5$ |
|---|---|
| 0 0 0 0 | 1 1 0 0 1 |
| 0 0 0 1 | 1 1 0 1 1 |
| 0 0 1 0 | 1 0 0 1 0 |
| 0 0 1 1 | 1 0 0 1 1 |
| 0 1 0 0 | 1 1 1 0 1 |
| 0 1 0 1 | 1 0 1 0 1 |
| 0 1 1 0 | 1 0 1 1 0 |
| 0 1 1 1 | 1 0 1 1 1 |
| 1 0 0 0 | 1 1 0 1 0 |
| 1 0 0 1 | 0 1 0 0 1 |
| 1 0 1 0 | 0 1 0 1 0 |
| 1 0 1 1 | 0 1 0 1 1 |
| 1 1 0 0 | 1 1 1 1 0 |
| 1 1 0 1 | 0 1 1 0 1 |
| 1 1 1 0 | 0 1 1 1 0 |
| 1 1 1 1 | 0 1 1 1 1 |
|  | 1 1 1 1 1 |

$P_1 = \bar{X}_1 + \bar{X}_3 \bar{X}_4$ $P_2 = \bar{X}_1 + \bar{X}_3 (\bar{X}_2 + \bar{X}_4)$ $P_3 = X_2$ $P_4 = X_3 + X_1 \bar{X}_4 + \bar{X}_1 \bar{X}_2 X_4$ $P_5 = X_4 + \bar{X}_1 \bar{X}_3$ $X_1 = \bar{P}_1 + P_2 \bar{P}_5$ $X_2 = P_3$ $X_3 = P_4 (\bar{P}_1 + \bar{P}_2)$ $X_4 = P_5 (\bar{P}_1 + \bar{P}_2 + P_4)$

Fig. 1

|   | 28 | 29 | 30 | 31 | 32 |
|---|---|---|---|---|---|
| a | 1 | 9 | 7 | 5 | 3 |
| b | 2 | 10 | 8 | 6 | 4 |
| c | 3 | 1 | 9 | 7 | 5 |
| d | 4 | 2 | 10 | 8 | 6 |
| e | 5 | 3 | 1 | 9 | 7 |
| f | 6 | 4 | 2 | 10 | 8 |
| g | 7 | 5 | 3 | 1 | 9 |
| h | 8 | 6 | 4 | 2 | 10 |
| i | 9 | 7 | 5 | 3 | 1 |
| j | 10 | 8 | 6 | 4 | 2 |
| a | 1 | 9 | 7 | 5 | 3 |
| b | 2 | 10 | 8 | 6 | 4 |
| c | 3 | 1 | 9 | 7 | 5 |
| d | 4 | 2 | 10 | 8 | 6 |
| e | 5 | 3 | 1 | 9 | 7 |

Fig. 4

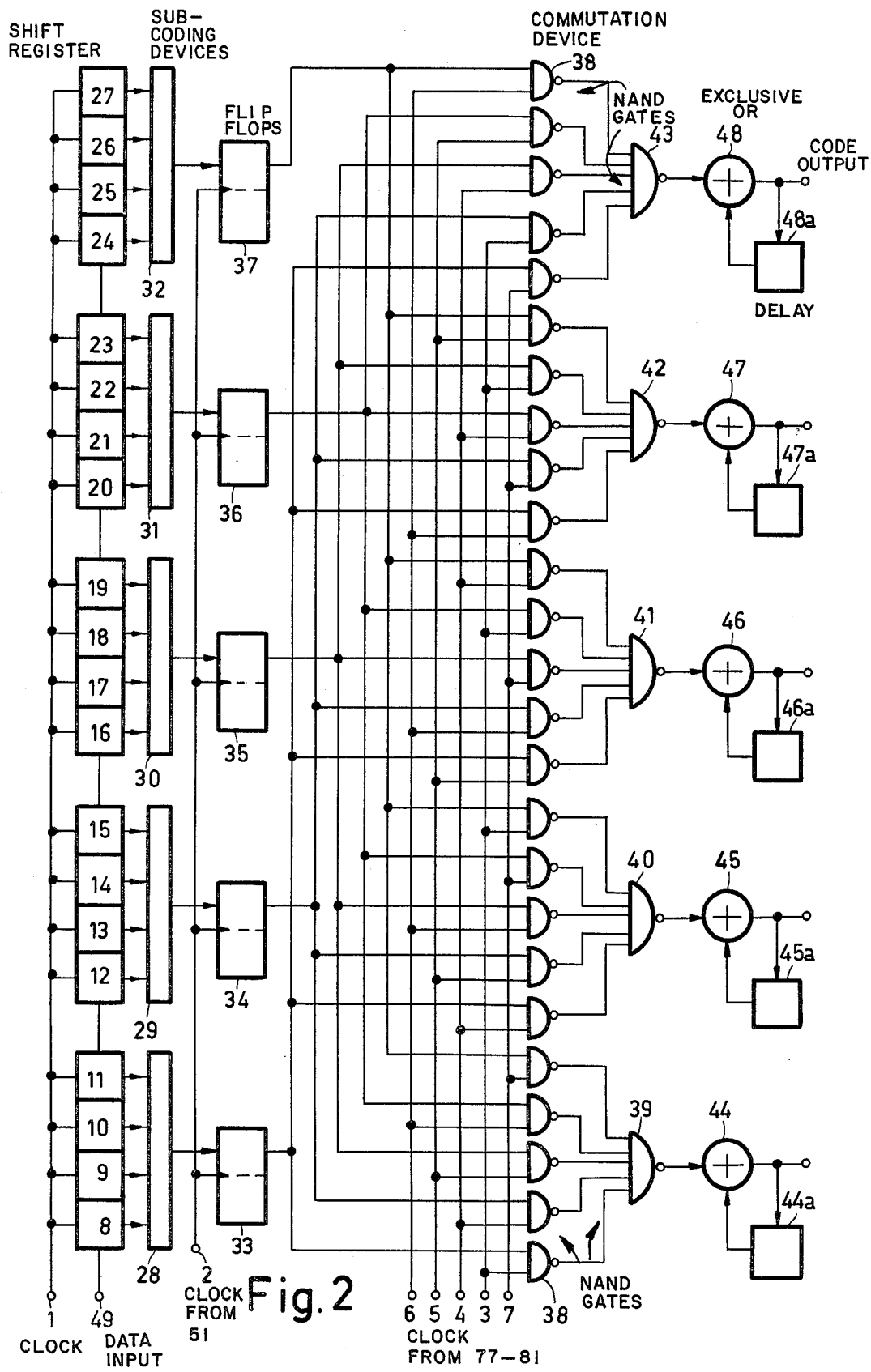

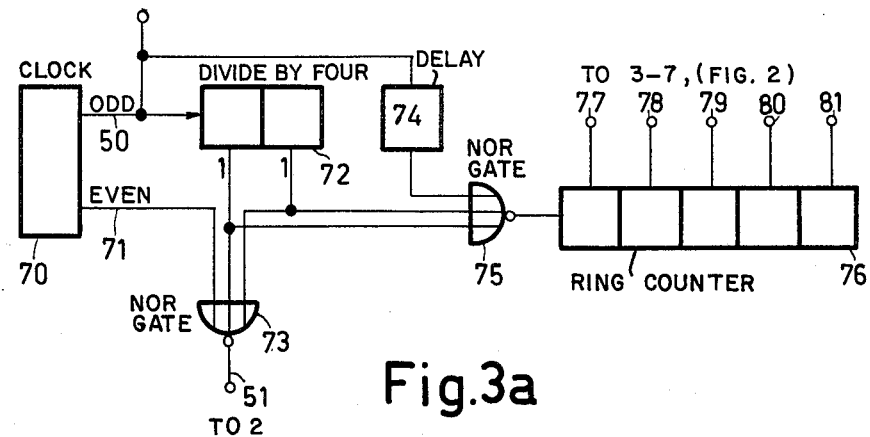
Fig.3a
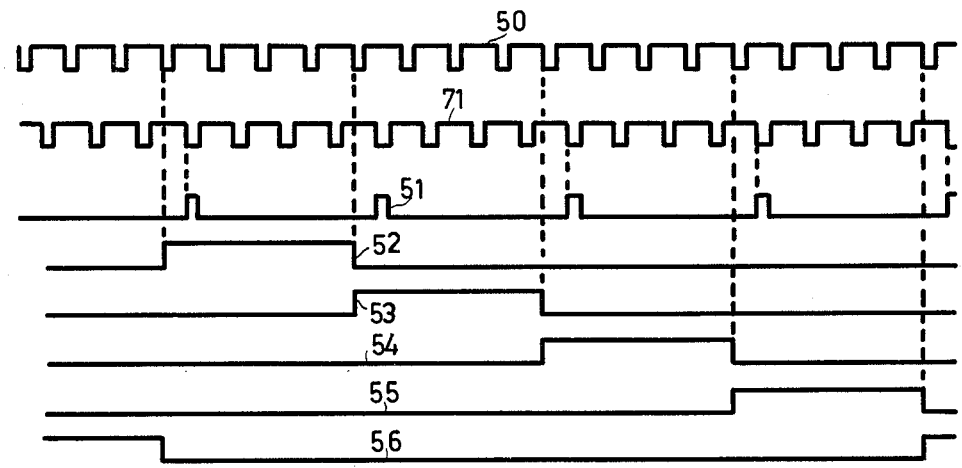
Fig.3b
| | 28 | 29 | 30 | 31 | 32 |
|---|---|---|---|---|---|
| 3 | 44 | | | | |
| 4 | 45 | 44 | | | |
| 5 | 46 | 45 | 44 | | |
| 6 | 47 | 46 | 45 | 44 | |
| 7 | 48 | 47 | 46 | 45 | 44 |
| 3 | 44 | 48 | 47 | 46 | 45 |
| 4 | 45 | 44 | 48 | 47 | 46 |
| 5 | 46 | 45 | 44 | 48 | 47 |
| 6 | 47 | 46 | 45 | 44 | 48 |
| 7 | 48 | 47 | 46 | 45 | 44 |
| 3 | 44 | 48 | 47 | 46 | 45 |
Fig.3c

|  | 128 | 129 |
|---|---|---|
| 115 | 123 | 125 |
| 116 | 124 | 126 |
| 117 | 125 | 123 |
| 118 | 126 | 124 |

DEVICE FOR CODING SIGNALS WHICH ARE DISTRIBUTED BETWEEN A NUMBER OF CHANNELS

This is a continuation of application Ser. No. 136,238, now abandoned, filed Apr. 1, 1980, which is a continuation of Ser. No. 913,297, filed June 27, 1978, now abandoned.

BACKGROUND OF THE INVENTION

1. Field of the Invention

The invention relates to a device for introducing digital signals into a medium having at least bivalent states comprising a data input for serially receiving a flow of data bits under the control of a first clock pulse series, and a coding device having an input which is connected to the data input and an output which is connected to said medium in order to apply thereto, under the control of a second clock pulse series, a flow of code bits which has been changed with respect to the flow of data bits by a commutation device while satisfying predetermined code restrictions, the code conversion having an efficiency $1/p$ which is smaller than 1, and wherein $1/p$ is a rational fraction. The medium may be a magnetizable tape which can be driven along a read/write head device. "Introducing" is to be understood to mean storing in this context. Alternatively, a channel for data transmission may be concerned. Introducing is then to be understood to mean transmitting. The data bits as well as the code bits may be bivalent or multi-valent, independent of each other. The code bits of a given value may imply a status transition (NRZ-1 code) in the medium. Other codes are also known, for example, the NRZ code. It is often desirable to add synchronization information to the code bits for autosynchronization. Therefore, preferably a large number of status transitions occurs.

2. Description of the Prior Art

Notably known is an algorithm for limiting the number of directly successive code bits without transition, both within a single code word and in a succession of two or more code words. For example, P. A. Franasek, "Sequence-state-methods for run-length limited coding", IBM Journal of Research and Development, July 1970, pages 376-382, describes a variety of such codes. A known and frequently used method is that in which a data word comprising four data bits is converted into a code word comprising five code bits. Another known method having this property is the so-called Miller code which will be described in detail hereinafter. Also known are other mechanisms whereby data bits are converted into code bits while satisfying given code restrictions. The code efficiency of the coding device is almost always smaller than 1; in the above cases it amounts to 0.8 and 0.5, respectively. A problem exists in that some data generators exhibit an extremely high serial bit rate. An example of this problem is found in, television cameras, even those having a simple construction. Said medium may be provided with a single channel having a high bit rate, but sometimes this is very problematic, notably if use would have to be made of a linear recorder. This storage medium would then require a particularly large bandwidth. Similar problems occur in the case of a channel for data transmission. The invention has for its object to enable, in the described surroundings (but not restricted thereto), the use of channels in the medium which are capable of receiving only a limited bit rate, without each separate channel requiring its own coding device.

SUMMARY OF THE INVENTION

This invention provides a coding device adapted to form, on $n>1$ outputs thereof, for each output n code bits combined together on the basis of running selections from the data bits and to apply these code bits to a commutation device comprising n inputs and a second number of $m \geq n$ outputs which are connected in parallel to inputs of said medium in order to apply, under the control of a second clock pulse series, cyclically switching between said m outputs, said n code bits selectively to said medium for introduction, while said code restrictions are satisfied per input channel of the medium.

Because said selections are running, they can be readily formed as branch points of a data input shift register. For each of said n code bits, a very simple logic function generator often suffices.

Preferably, the ratio between the clock pulse frequencies of the first clock pulse series and the second clock pulse series equals $(p/n)$. The second clock pulse frequency will then often be comparatively low, with the result that the device may be less expensive and/or the energy consumption is lower. This is applicable to the coding device as well as to the commutation device. In the case $m>n$, the characteristic frequency for each channel separately will even be lower. Furthermore, the ratio of m and n is preferably an integer number. This ratio may be, for example, 1 or 2. The smaller the bandwidth of the channels in the medium, the larger the chosen ratio number will be. However, in given cases this ratio may also be a simple fraction, for example, $m/n = 3/2$. Preferably, the coding device comprises a cycle of n series-connected sub-coding devices for generating, on the basis of a data word received by a sub-coding device, a pedetermined part of a code word within a cycle of its n parts, the commutation device having an n-multiple number of positions for applying the code bits of a single code word to only a single input of the medium. Each of the sub-coding devices need then generate, for example, only one or two bits within a code word, so they may have a simple construction. For later processing it is very useful if all elements of one code word are present, on only one channel of the medium. In this respect, the term data word need not relate to the significance of the data for a data generator. The latter may be, for example, a computer with a word length of 16 bits. In the coding device, this length can be split for storage of data words of four bits each.

Preferably, the coding device is adapted to pass on a predetermined selection of the data bits as a code bit without modification. This results in a further simplification of the coding device, as will be described hereinafter.

Furthermore, for $m=n$ an NRZ-1 coding element is preferably connected between the relevant outputs of the commutation device and the inputs of the medium. The capacity of the medium is thus very advantageously utilized.

The invention will be described in detail hereinafter with reference to the accompanying diagrammatic drawing.

BRIEF DESCRIPTION OF THE DRAWINGS

FIG. 1 shows a four-on-five image as an example of a code.

FIG. 2 shows the logical circuit of the preferred embodiment coding and commutation device.

FIG. 3a shows a first control circuit for the circuit of FIG. 2.

FIG. 3b is a time diagram of the signals generated by the control circuit of FIG. 3a and the delay element of FIG. 2.

FIG. 3c is a table of the sequence in which commutation inputs establish a connection between the sub-coding device of FIG. 2 and the exclusive OR elements therein.

FIG. 4 is a table similar to that of FIG. 3c except for an increase in the number of inputs.

DESCRIPTION OF THE PREFERRED EMBODIMENTS

Figures 5, 6:
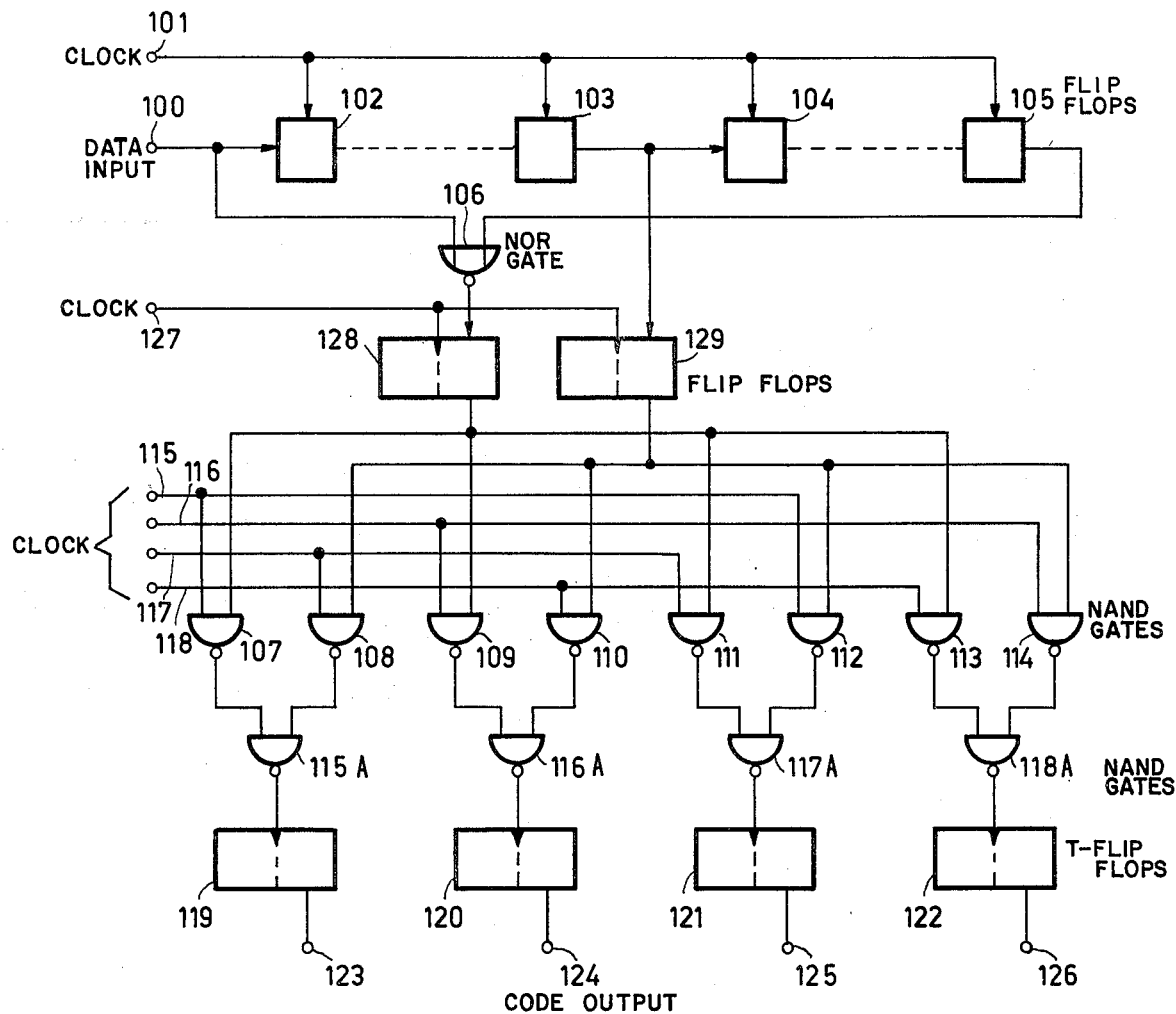
FIG. 5 is a second embodiment of the coding and commutation device of the present invention.
FIG. 6 is a sequence table for the embodiment of FIG. 5.

The left column of FIG. 1 shows the sixteen feasible data words in the case of four bits per word. The central column states the seventeen feasible code words of a (d, k)=(0,2) code. In that case code elements implying a status transition, one (1), may be arranged in direct succession, while at the most two code elements without transition, zero (0), may occur in direct succession. Coding is effected one word after the other. At the beginning and at the end of a code word, at the most one code bit zero may occur. Within a code word, at the most two code bits zero may occur in succession. The translation of data words into code words can be realized in a variety of manners. The conversion shown is described in an article by E. T. Ringkjøb, Achieving a fast data rate by optimizing existing technology, Electronics 48 (750501), 86 ff. The code word (11111) remaining may obtain a special significance. The translation of the four data bits into the five code bits and vice versa can be realized as shown in the right hand column of FIG. 1. The bar denote the inverted values of the binary elements.

The translation according to the given function can be realized by means of gates. Alternatively, the data words may address a read-only memory comprising sixteen address locations. The word length therein is adapted to the length of the part of a code word to be generated. The invention is not restricted to a given code. Other codes are described in the previous Netherlands Patent Application No. 7605529 (PHN 8407) in the name of applicant, incorporated herein by way of reference.

FIG. 2 shows a coding and multiplex device which is suitable for operation with data and code words in accordance with FIG. 1. The device comprises eight input terminals 1 through 49, a shift register comprising twenty one-bit stages 8 through 27, five sub-coding devices 28 through 32, five data flipflops 33 through 37, an array of twenty-five NAND-gates 38 and five further NAND-gates 39 through 43, five EXCLUSIVE-OR elements 44 through 48, and five delay elements 44a, 45a, 46a, 47a, 48a. The data words arrive from a data source (not shown) in a continuous bit flow on the input 49. In this embodiment, the formation of data words takes place only because the shift register is subdivided into five groups of four one-bit stages 8 through 11, 12 through 15, 16 through 19, 20 through 23 and 24 through 27. On the other hand, the data themselves can already be organized according to data words if the data contain numbers in a hexa-decimal code. The only important aspect is that the input 49 receives a serial bit flow. In synchronism with the data bits, input terminal 1 receives a series of clocked shift pulses. In this respect, FIG. 3a illustrates a first relevant control mode. Clock pulse generator 70 provides clock pulse cycles with a repetition frequency f0, each cycle consisting of an odd clock pulse on the line 50 and an even clock pulse on the line 71; see the time diagram of these signals, curves 50 and 71, respectively, in FIG. 3b. The element 72 is a divide-by four, comprising two divide-by-two stages, the output signals of which are applied to NOR-gate 73. After three clock pulses, both stages of the divider 72 supply a low signal, so that the fourth clock pulse on the line 71 is applied in inverted form to the terminal 51. This signal is applied to the terminal 2 in FIG. 2 and controls the storage of a code bit in the relevant data flipflop 33 through 37. After four clock pulses on the line 50, the first data word is present in the shift register stages 8 through 11. The sub-coding device 28 of this embodiment forms, by way of combinatory logic according to the right hand column of FIG. 1, the first code bit of the code word corresponding to the four relevant data bits. After four further clock pulses, the first data word is present in the shift register stages 12 through 15. The sub-coding device 29 then forms the second code bit of the relevant code word, while at the same time the sub-coding device 28 forms the first code bit of the subsequent code word on the basis of the next data word then present in the shift register stages 8 through 11. The sub-coding devices 30 through 32 form the third, the fourth and the fifth code bits of the series of code words, respectively. In the foregoing, the sub-coding devices are only diagrammatically indicated; for example, in accordance with the right hand column of FIG. 1, the sub-coding device 30 need not do anything but transfer the second data bit present in shift register 18, without modification. This formation by combinatory logic does not necessitate additional clock pulse control for the sub-coding devices 28 through 32.

The NAND-gates of the array 38 are arranged in groups of five. The outputs of a group are connected together to one of the five NAND-gates 39 through 43. The input terminals 3 through 7 are usually at a low potential, so that the NAND-gates of the array 38 connected thereto are blocked, as explained hereinafter. However, one of the terminals 3 through 7 is always at a high potential as denoted by the lines 52 through 56 in FIG. 3b. The line 52 concerns the terminal 3, the line 53 concerns the terminal 4, and so forth. The series of NAND-gates 38, 39 through 43 thus consitutes a controlled commutation device. When the terminal 3 is high, the bit of flipflop 33 is conducted to NAND-gate 39, the bit of flipflop 34 is conducted to NAND-gate 43, the bit of flipflop 35 is conducted to NAND-gate 42, the bit of flopflop 36 is conducted to NAND-gate 41, and the bit of flipflop 37 is conducted to NAND-gate 40. When the terminal 4 is subsequently high, the bit of flipflop 33 is conducted to NAND-gate 40, the bit of flipflop 33 is conducted to NAND-gate 39, the bit of flipflop 34 is conducted to NAND-gate 43, the bit of flipflop 36 is conducted to NAND-gate 42, and the bit of flipflop 37 is conducted to NAND-gate 41. Each NAND-gate of the row 39 through 43 thus each time receives a next bit of a series of code words. The NAND-gate 39 then successively receives the first, the sixth, the eleventh code word; the NAND-gate 40 then successively receives the second, the seventh, the twelfth code word.

The clock signals 52 through 56 shown in FIG. 3b are generated when the clock pulse series 50 (FIG. 3a) is applied with a small delay through element 74, to the NOR-gate 75 which for the remainder receives the same signals as the NOR-gate 73. The output pulses of the gate 75 are thus slightly earlier. The ring counter 76 is advanced one position by each of these output signals. The outputs 77 through 81 are connected to the relevant terminals 3 through 7 of FIG. 2. If one of the gates of the array 38 supplies a signal, this signal is conducted, via the associated gate of the series 39 through 43, to the exclusive OR-elements 44 through 48. The outputs thereof are fed back to the other input thereof each time by one of the delay elements 44A through 48A. The delay time thereof corresponds to the length of the pulses 52 through 56 in FIG. 3b and the signals originating from the coding device are thus converted into an NRZ-1 code in known manner. Each signal 1 then represents a status transition. The write heads (or transmission generators), connected to the EXCLUSIVE-OR gates but not shown for the sake of simplicity, then supply a corresponding signal. The table in FIG. 3c thus shows the sequence in which the commutation inputs 3 through 7 establish a connection between the sub-coding device (28 through 32) states above and the EXCLUSIVE-OR element (44 through 48).

In the foregoing, m=n=5. In this res FIG. 4 shows a second control mode for a device according to the general principle of FIG. 2. However, the number of inputs is increased from 5 to 10 (1 through 10), while the number of commutation control inputs (3 through 7 in FIG. 2) is also assumed to be increased to 10 (a through j). The table again shows the connections established. In this case a full cycle has been completed after the horizontal interrupted line. A channel will never receive two directly successive code bits in this case. As a result, each NRZ-1 coding elements (EXCLUSIVE-OR-gate plus delay element) is replaced by a flipflop which changes its position upon reception of a signal, but which otherwise maintains its position. A further addition to the device shown in FIG. 2 consists in that the four shift register stages (8 through 11, 12 through 15, 16 through 19, 20 through 22) are each time replaced by $4/5 \times m$ shift register stages (for m=10: eight register stages). Thus, the data are sufficiently separated. This is also possible in FIG. 2 by the introduction of additional shift register stages, but not all flipflops 33 through 37 will then be loaded simultaneously.

FIG. 5 shows a second embodiment of the coding and commutation device of this invention. The data bits arrive serially on the input 100 and are stored, under the control of a first clock pulse series on the input 101, and are shifted into the series of flipflops 102 through 105 which together constitute a shift register. In this simple embodiment, this shift register comprises four stages. NOR-gate (NOR) 106 receives the data on the input 100 and on the output of the flipflop 105. The data on the outputs of the elements 103 and 106 are stored in the data flipflops 128 and 129, respectively. This is realized under the control of a clock pulse series on the terminal 127, the pulses of which alternate each time with the pulses on the input 101. Each of the data on the outputs of the flipflops 128, 129 is applied to four of the logic NAND-gates 107 through 114. On the four inputs 115 through 118, a one-out-of-four signal appears, so that each time only two of said NAND-gates 107 through 114 can conduct at the same time: the commutation device is thus formed. The outputs of the NAND-gates 107 through 114 are pair-wise connected to one of the NAND-gates 115 through 118 which are connected via one of the T-flipflops 119 through 122, to one of the outputs 123 through 126. Thus, in this embodiment the commutation device comprises twice as many outputs as it comprises inputs. FIG. 6 shows the relevant control modes in the same way as the FIGS. 3, 4. In this case a time interval exists each time between the code signals supplied by the gates 115 through 118, so the presence of an NRZ-1 intermediate coding element behind these gates is not required: a single T-flipflop per channel suffices.

Figure 7:
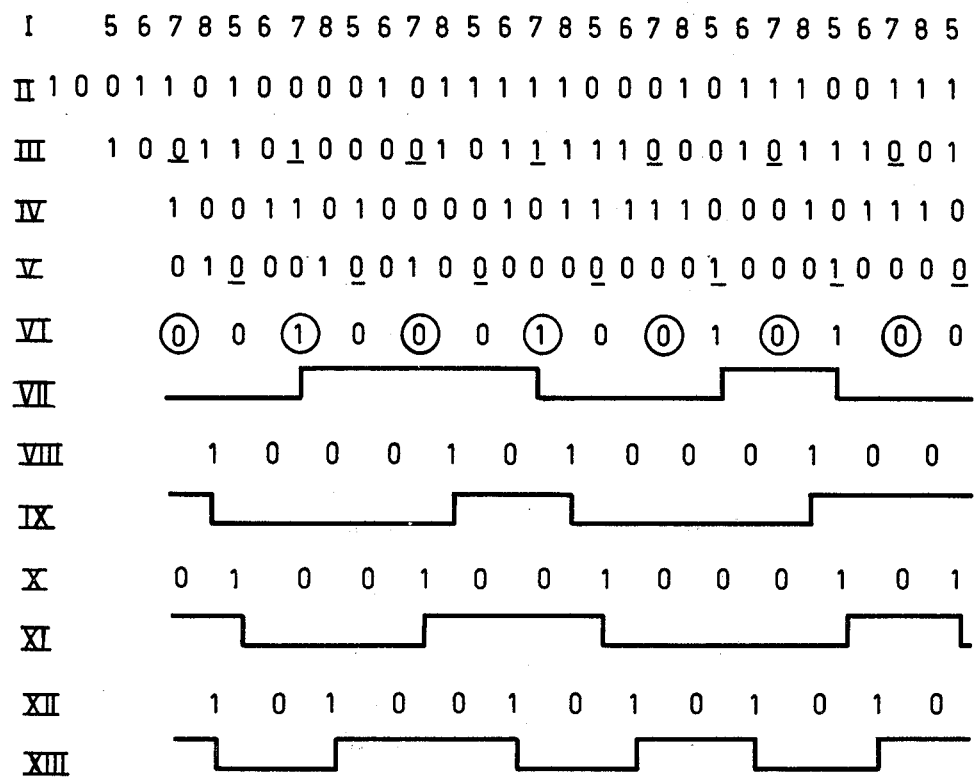
FIG. 7 is a time diagram of the various signals occurring in the circuit embodiment of FIG. 5.

In this respect, FIG. 7 shows a time diagram of the various signals occurring in the circuit arrangement shown in FIG. 5. The upper line 1 shows the actuation of the various inputs 115 through 118 ("5" signifies input 115, and so forth). In synchronism with the clock pulses on the input 101, the next one of these four inputs is thus actuated. The second line (II) states data signals on the input 100. The third line (III) states the same as the second line, but delayed by two clock pulse periods: these signals are the output signals of the flipflop 103. The fourth line (IV) shows the same as the third line, but again after a delay by two clock pulse periods: these signals are the output signals of the flip-flop 105. The fifth line (V) shows the output signals of the NOR-gate 106; this combination is thus formed between the signals of the second line and the fourth line. The sixth line (VI) shows the output signals of the NAND-gate 115A: this gate is alternately connected, by the clock pulses on the terminals 115, 117, to the signals on the third and the fifth lines, respectively of FIG. 7, (these signals are underlined on the relevant line). The seventh line (VII) shows the position of the flipflop 119 which remains the same when a "0" signal is received, but which changes its position upon reception of a "1" signal. The eighth (VIII) and the ninth (IX) line show the same for the elements connected to the output 124. The tenth (X) and the eleventh (XI) line show the same for the elements connected to the output 125. The twelvth (XII) and the thirteenth (XIII) line show the same for the elements connected to the output 126. The signals on the outputs 123 through 126 indicate the actuation for the elements which are connected therebehind, but which are not shown for the sake of simplicity, for example, a write head in the case of data storage on a magnetic medium. It has been found that in this case the status transitions are not situated nearer to each other than an interval corresponding to four clock pulse periods on the input 101. The formation of the code can now be briefly described as follows: the encircled code bits on the line VI correspond to the underlined data bits on the line III. The other code bits on the line VI are all equal to zero, except when they are situated between two other code bits zero. A similar consideration is applicable to the lines VIII, X and XII in FIG. 7. As a result of the NRZ-1 code, use can also be made of a narrow-band medium.

Dotted lines are shown in FIG. 5 each time between the pairs of flipflops 102/103 and 104/105. Generally, the shift register (102 through 105) comprises as many stages as there are outputs (123 through 126), said stages being arranged in two equal groups (102/103 and 104/105). Therefore, if there are only two output signals, the shift register also comprises only two stages. However, in that case a said NRZ-1 coding element is again required per channel.

Figure 8:
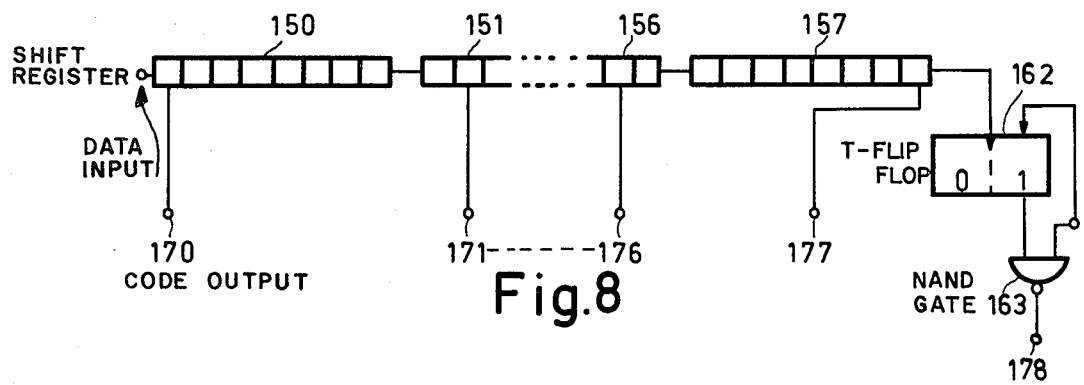
FIG. 8 shows a third embodiment of the coding device of the present invention modified for either data bits per word.

FIG. 8 shows a third embodiment of the coding device, i.e. for eight data bits per word. The device adds a ninth code bit thereto as a parity bit for the distribution between nine channels which then receive code words of odd parity. It is assumed that the input data already satisfy the NRZ-1 criterion. The shift register comprises eight sub-shift registers 150 through 157 comprising eight stages each. The first stage of the shift register 150 forms the first code bit, the second stage of the shift register 151 forms the second code bit, and so forth. The flipflop 162 is connected to the output of the shift register part 157 as a T flipflop and counts the "1" data bits. In the zero position, the "1" output of the flipflop supplies a high signal. If this number of ones is odd after eight shift pulses, i.e. at the end of a data word, the "one" output of the flipflop 162 supplies a low signal. If the storage control pulse according to the signal 51 in FIG. 3b then becomes high, NAND gate 163 does not supply a signal. If this number of "ones" was even (0, 2, 4, ... ), the "one" output of flipflop 162 supplies a high signal. By the NAND-gate 163, a parity bit is then generated. The outputs 170 through 178 are applied to the medium by a commutation device (not shown). The storage control pulse each time forms a reset signal for the flipflop 162.

What is claimed is:

1. A device for introducing digital signals into a medium having at least bivalent states, comprising:
   clock means;
   data input means for serially receiving a flow of data bits under the control of a first clock pulse series at a first frequency generated by said clock means;
   coding means for receiving said flow of data bits from said data input means and for generating n code bits in parallel based on running selections from said data bits received under control of a second clock pulse series at a second frequency generated by said clock pulse means, said second frequency being n/p times lower than said first frequency, wherein p is greater than 1;
   commutation means having n inputs connected to said coding means for receiving said generated n code bits, said commutation means being provided for cyclically commuting synchronously with said second clock pulse series the sequence of said n code bits to $m = j \times n$ outputs thereof, wherein j is an integer and wherein each of the n code bits received at said inputs is presented to at least one of said m outputs, said m outputs being connected to m input channels of said medium for the transmission of the code bits at said m outputs.

2. A device as claimed in claim 1, wherein said coding means comprise a plurality of serially connected shift registers, each of said shift registers having an output thereof connected to an input of a sub-coding device for generating thereby one of said code bits.

3. A device as claimed in claim 1 wherein the coding device is adapted to pass on a predetermined selection of the data bits as a code bit without modification.

4. A device as claimed in claim 1 characterized in that for m=n, an NRZ-1 coding element is connected between the relevant outputs of the commutation device and the inputs of the medium.

* * * * *